(12) United States Patent
Hay et al.

(10) Patent No.: US 10,528,744 B2
(45) Date of Patent: *Jan. 7, 2020

(54) DETECTING SECURITY VULNERABILITIES ON COMPUTING DEVICES

(71) Applicant: International Business Machines Corporation, Armonk, NY (US)

(72) Inventors: Roee Hay, Haifa (IL); Daniel Kalman, Tel Aviv (IL); Roi Saltzman, Rishon le Zion (IL); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,411

(22) Filed: Apr. 30, 2018

(65) Prior Publication Data

US 2018/0247060 A1 Aug. 30, 2018

Related U.S. Application Data

(63) Continuation of application No. 13/705,705, filed on Dec. 5, 2012, now Pat. No. 9,977,903.

(51) Int. Cl.
*G06F 21/00* (2013.01)
*G06F 21/57* (2013.01)
(Continued)

(52) U.S. Cl.
CPC ............ *G06F 21/577* (2013.01); *G06F 21/52* (2013.01); *G06F 21/554* (2013.01);
(Continued)

(58) Field of Classification Search
None
See application file for complete search history.

(56) References Cited

U.S. PATENT DOCUMENTS 8,095,517 B2 1/2012 Sandoval et al.
9,959,411 B2 5/2018 Hay et al.
(Continued)

FOREIGN PATENT DOCUMENTS

CN 1954293 A 4/2007
CN 101504622 A 8/2009
CN 103853982 A 6/2014

OTHER PUBLICATIONS

Fuchs, A.P. et al., "SCanDroid: Automated Security Certification of Android Applications", Technical Report, University of Maryland, College Park, 2009, 15 pgs.

(Continued)

*Primary Examiner* — Andrew J Steinle
(74) *Attorney, Agent, or Firm* — Cuenot, Forsythe & Kim, LLC

(57) ABSTRACT

Identifying security vulnerabilities on computing devices by detecting an inter-process communication on a computing device, determining whether the inter-process communication is consistent with a predefined specification of a security vulnerability, and causing a predefined action to be performed on the computing device responsive to determining that the inter-process communication is consistent with a predefined specification of a security vulnerability.

18 Claims, 3 Drawing Sheets

(51) Int. Cl.
  G06F 21/62    (2013.01)
  G06F 21/56    (2013.01)
  G06F 21/52    (2013.01)
  G06F 21/60    (2013.01)
  G06F 21/55    (2013.01)

(52) U.S. Cl.
  CPC .......... G06F 21/566 (2013.01); G06F 21/606 (2013.01); G06F 21/62 (2013.01)

(56) References Cited

U.S. PATENT DOCUMENTS

| | | | |
|---|---|---|---|
| 2004/0199763 A1* | 10/2004 | Freund | G06F 21/53 713/154 |
| 2006/0259967 A1 | 11/2006 | Thomas et al. | |
| 2007/0266392 A1 | 11/2007 | Thoelke | |
| 2012/0110174 A1 | 5/2012 | Wootton et al. | |
| 2014/0149210 A1 | 5/2014 | Ma et al. | |
| 2014/0157418 A1 | 6/2014 | Hay et al. | |
| 2014/0157421 A1 | 6/2014 | Hay et al. | |

OTHER PUBLICATIONS

Tripp, O. et al., "TAJ: Effective Taint Analysis of Web Applications", PLDI '09 Proc. of 2009 ACM SIGPLAN Conf. on Programming, Language Design and Implementation, pp. 87-97, Jun. 15-20, 2009.

"IBM Security AppScan Standard", [online] International Business Machines Corporation, © Jun. 2012 [retrieved on Jul. 11, 2012] retrieved from the Internet: <URL: http://www-01.ibm.com/software/awdtools/appscan/standard/>, 2 pgs.

Shah, K., "Penetration Testing Android Applications", [online] Whitepaper, Foundstone, a division of McAfee © 2011, [retrieved Dec. 3, 2012] retrieved from the Internet: <http://www.mcafee.com/us/resources/white-papers/foundstone/wp-pen-testing-android-apps.pdf>, 22 pgs.

Chin, E. et al., "Analyzing Inter-Application Communication in Android", 9th Int'l. Conf. on Mobile Systems, Applications and Services, MobiSys '11, Jun. 28-Jul. 1, 2011, 14 pgs.

Henry, A.,"Do Android Antivirus Apps Actually Do Anything?", [online] Lifehacker, Nov. 22, 2011 [retrieved Jul. 11, 2012] retrieved from the Internet: <http://lifehacker.com/5861757/do-android-antivirus-apps-actually-do-anything>, 5 pgs.

Felt, A.P., "Smartsec, A smartphone and web security research blog: Android Intent Vulnerabilities", [online] Sep. 28, 2011, [retrieved Jul. 11, 2012] retrieved from the Internet: <http://www.adrienneporterfelt.com/blog/?p=313>, 2 pgs.

"Android Security Tools—Tutorials, Articles, Algorithms, Tips, Examples . . . ", [online] Programming4us, Oct. 11, 2010 [retrieved Jul. 11, 2011] retrieved from the Internet: <http://programming4.us/mobile/1306.aspx>, 4 pgs.

"IBM Security AppScan: Application security and risk management", [online] IBM Corporation, © Jun. 2012 [retrieved on Dec. 3, 2012] retrieved from the Internet: <http://public.dhe.ibm.com/common/ssi/ecm/en/rab14001usen/RAB14001USEN.PDF>, 8 pgs.

"Malware | The IT Law Wiki," [online] Fandom [retrieved Apr. 30, 2018], retrieved from the Internet: <http://itlaw.wikia.com/wiki/Malware>, 6 pg.

U.S. Appl. No. 13/705,705 Non-Final Office Action, dated Jan. 3, 2014, 7 pg.

U.S. Appl. No. 13/705,705 Final Office Action, dated May 6, 2014, 10 pg.

U.S. Appl. No. 13/705,705 Advisory Action, dated Jul. 22, 2014, 3 pg.

U.S. Appl. No. 13/705,705, Examiner's Answer, dated Nov. 14, 2014, 5 pg.

U.S. Appl. No. 13/705,705, Decision on Appeal, dated Sep. 28, 2016, 6 pg.

U.S. Appl. No. 13/705,705, Non-Final Office Action, dated Feb. 7, 2017, 16 pg.

U.S. Appl. No. 13/705,705, Final Office Action, dated May 25, 2017, 17 pg.

U.S. Appl. No. 13/705,705, Notice of Allowance, dated Jan. 19, 2018, 9 pg.

U.S. Appl. No. 14/026,347, Non-Final Office Action, dated Apr. 23, 2014, 9 pg.

U.S. Appl. No. 14/026,347, Final Office Action, dated Jul. 25, 2014, 10 pg.

U.S. Appl. No. 14/026,347 Examiner's Answer, dated Mar. 12, 2015, 11 pg.

U.S. Appl. No. 14/026,347, Decision on Appeal, dated Sep. 28, 2016, 6 pg.

U.S. Appl. No. 14/026,347, Non-Final Office Action, dated Feb. 7, 2017, 15 pg.

U.S. Appl. No. 14/026,347, Final Office Action, dated May 25, 2017, 14 pg.

U.S. Appl. No. 14/026,347, Notice of Allowance, dated Dec. 22, 2017, 10 pg.

* cited by examiner

DETECTING SECURITY VULNERABILITIES ON COMPUTING DEVICES

FIELD OF THE INVENTION

The invention relates in general to computer-based tools for detecting security vulnerabilities.

BACKGROUND

Inter-process communication channels provided by computer operating systems such as iOS™ and Android™ have been shown to expose computer users to security risks such as broadcast theft, activity hijacking, service hijacking, broadcast injection, and unauthorized launch of activities and services. For example, the Intent-based mechanism of Android™ for moving data between processes, including applications or components within applications, have been shown to expose users to risks due to improper authentication of incoming Intents or unsafe Intents that transmit sensitive information.

BRIEF SUMMARY

In one aspect of the invention a method is provided for identifying security vulnerabilities on computing devices, the method including detecting an inter-process communication on a computing device, determining whether the inter-process communication is consistent with a predefined specification of a security vulnerability, and causing a predefined action to be performed on the computing device responsive to determining that the inter-process communication is consistent with a predefined specification of a security vulnerability.

In other aspects of the invention systems and computer program products embodying the invention are provided.

BRIEF DESCRIPTION OF THE SEVERAL VIEWS OF THE DRAWINGS

The invention will be understood and appreciated more fully from the following detailed description taken in conjunction with the appended drawings in which.

DETAILED DESCRIPTION

Figure 1:
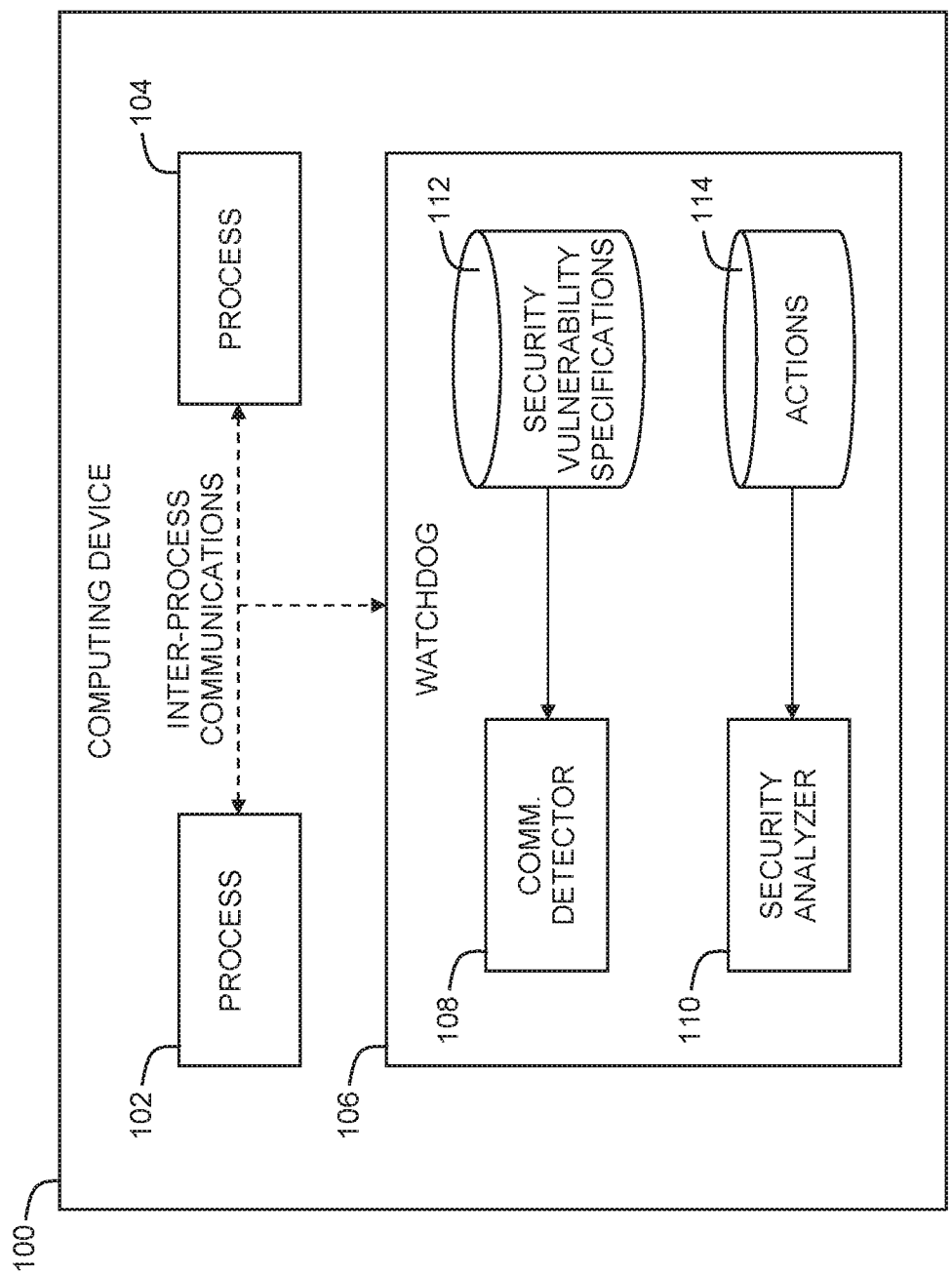
FIG. 1 is a simplified conceptual illustration of a system for detecting security vulnerabilities on a computing device, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for detecting security vulnerabilities on a computing device, constructed and operative in accordance with an embodiment of the invention. In the system of FIG. 1, a computing device 100 is shown, which may be a mobile telephone, a personal digital assistant, or any other type of computing device capable of hosting an operating system that supports communications between processes, such as the Android operating system, commercially available from Google Corporation, Mountain View, Calif., or the iOS operating system, commercially available from Apple Incorporated, Cupertino, Calif. The term "process" as used herein may refer to any of software applications running on computing device 100, components within such software applications, and components of the operating system itself. Two such processes 102 and 104 are shown running on computing device 100.

A watchdog application 106 is also shown running on computing device 100, where watchdog application 106 preferably includes a communications detector 108 and a security analyzer 110. Communications detector 108 is configured to detect inter-process communications on computing device 100, such as communications between processes 102 and 104. For example, where computing device 100 hosts the Android™ operating system, communications detector 108 may access "manifest" data associated with the software applications installed on computing device 100 to identify the types of inter-process communications known as "implicit intents" that the software applications can accept, whereupon communications detector 108 modifies the manifest data of watchdog application 106 to indicate that it, too, can accept the same types of inter-process communications. Communications detector 108 may additionally or alternatively be configured to enable watchdog application 106 to receive broadcast communications from any process running on computing device 100.

Security analyzer 110 is configured, for any inter-process communications detected on computing device 100 by communications detector 108, to determine whether the inter-process communications are consistent with a predefined specification of a security vulnerability, preferably where such predefined specifications are stored in a set of specifications 112 that is accessible to communications detector 108. The security vulnerability may, for example, be a susceptibility to an integrity attack or a susceptibility to a confidentiality violation. If the inter-process communications are determined to be consistent with a predefined specification of a security vulnerability, security analyzer 110 preferably causes a predefined action relating to the discovery of the security vulnerability to be performed on computing device 100, preferably where such predefined actions are stored in a set of actions 114 that is accessible to communications detector 108. Such actions may include providing a notification to a user of computing device 100, such as via a speaker or a display of computing device 100, describing the security vulnerability, and/or terminating or otherwise quarantining the application(s) or component(s) that issued the inter-process communications.

Any of the elements shown in FIG. 1 are preferably implemented by, are embodied within, or are otherwise accessible to, computing device 100, such as by implementing any of the elements in computer hardware and/or in computer software embodied in a non-transitory, computer-readable medium in accordance with conventional techniques.

Figure 2:
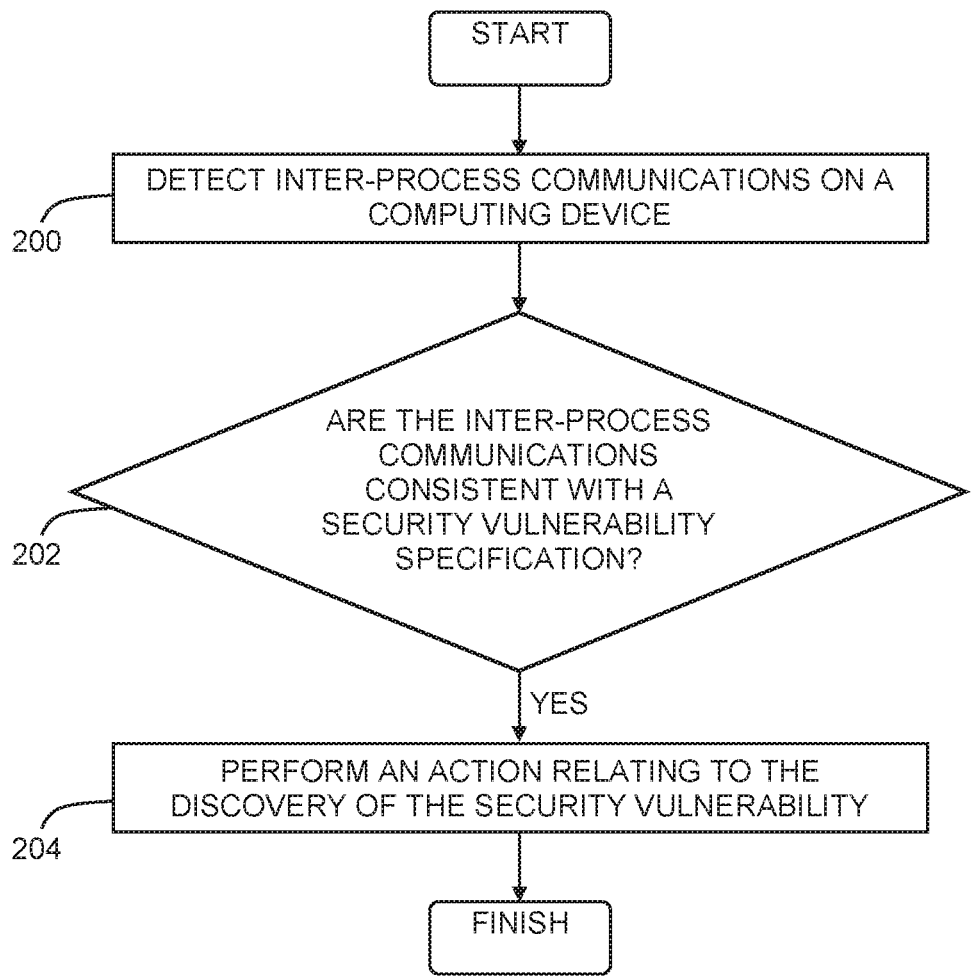
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, inter-process communications on a computing device are detected (step 200). If the inter-process communications are consistent with a predefined specification of a security vulnerability (step 202), a predefined action relating to the discovery of the security vulnerability is caused to be performed on the computing device (step 204), such as where the action is providing a notification to a user of computing device 100 describing the security vulnerability, and/or terminating or otherwise quarantining the application(s) or component(s) that issued the inter-process communication(s).

The system of FIG. 1 and method of FIG. 2 may be illustrated in the context of the following examples:

Process 102 is a banking application. Process 104 broadcasts a message that is received by both process 102 and watchdog application 106. Process 102 responds to the message by broadcasting data that watchdog application 106 determines is consistent with bank account information. Watchdog application 106 displays a notification on computing device 100 indicating that process 102 exposed sensitive banking data in response to a message that process 102 received from process 104.

Process 102 is the email and calendar client of a commercial organization. Process 104 broadcasts a request for messages and meetings associated with a given date. Process 102 responds to the message by broadcasting respective data, which watchdog application 106 determines as sensitive information owned by the organization. Watchdog application 106 displays a notification on computing device 100 indicating that process 102 exposed sensitive banking data in response to a message that process 102 received from process 104.

Figure 3:
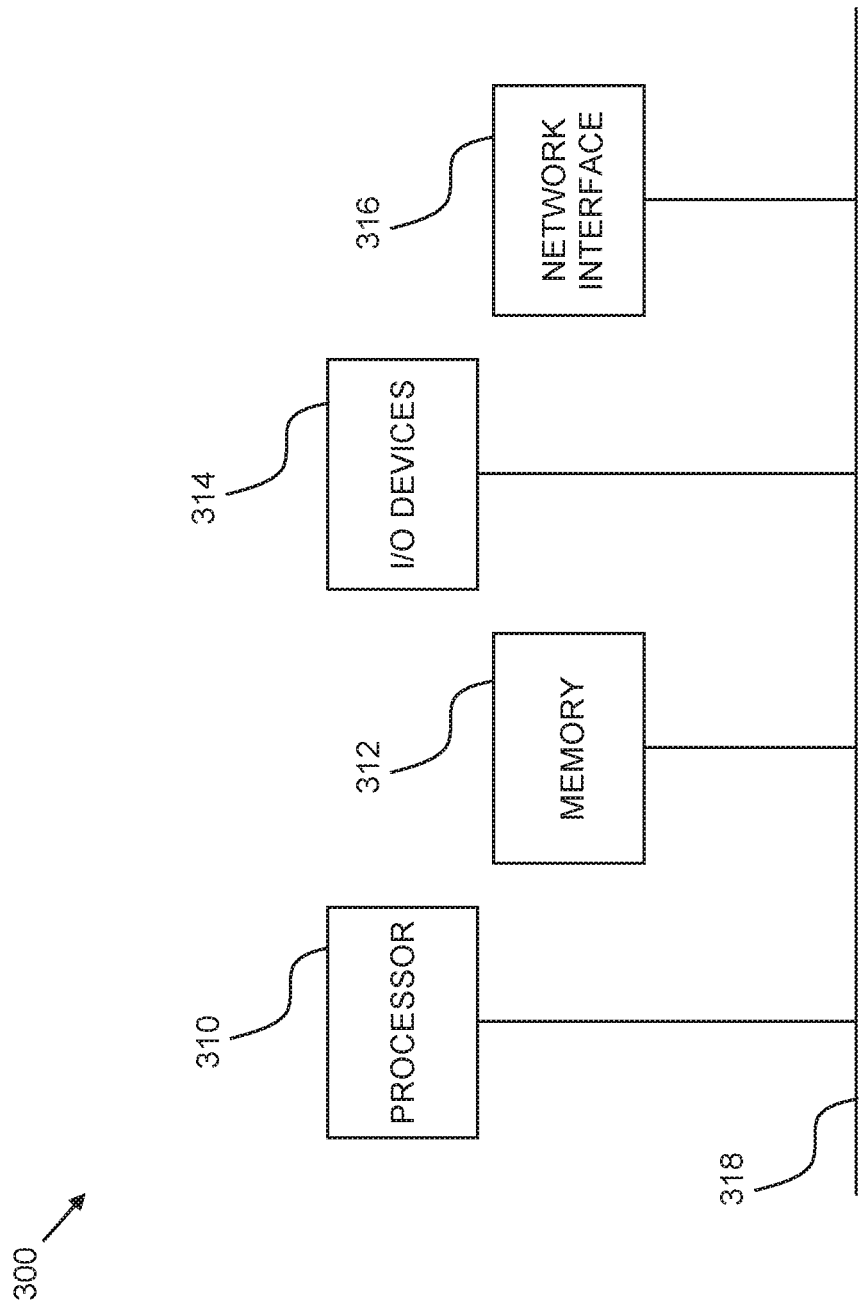
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method, comprising:
   identifying, by a monitoring application and from manifest data of a process executing within the computer hardware system, a type of inter-process communication associated with the process;
   rewriting, by the monitoring application, manifest data of the monitoring application to accept the type of inter-processing communication;
   determining, using the monitoring application, a type of the security vulnerability associated with an inter-process communication issued from the process; and
   performing, based upon the determined type of the security vulnerability, a predefined action.

2. The method of claim 1, wherein
   the predefined action is presenting, to a user, a description of the security vulnerability.

3. The method of claim 1, wherein
   the predefined action includes terminating the process.

4. The method of claim 1, wherein
   the predefined action includes quarantining the process.

5. The method of claim 1, wherein
   the determined type of security vulnerability is sensitive data being provided by the process.

6. The method of claim 1, wherein
   the determined type of security vulnerability is sensitive data being requested by the process.

7. A computer hardware system, comprising:
   a hardware processor programmed to initiate the following executable operations:
       identifying, by a monitoring application and from manifest data of a process executing within the computer hardware system, a type of inter-process communication associated with the process;
       rewriting, by the monitoring application, manifest data of the monitoring application to accept the type of inter-processing communication;
       determining, using the monitoring application, a type of the security vulnerability associated with an inter-process communication issued from the process; and
       performing, based upon the determined type of the security vulnerability, a predefined action.

8. The system of claim 7, wherein
   the predefined action is presenting, to a user, a description of the security vulnerability.

9. The system of claim 7, wherein
   the predefined action includes terminating the process.

10. The system of claim 7, wherein
    the predefined action includes quarantining the process.

11. The system of claim 7, wherein
    the determined type of security vulnerability is sensitive data being provided by the process.

12. The system of claim 7, wherein
    the determined type of security vulnerability is sensitive data being requested by the process.

13. A computer program product, comprising:
    a hardware storage device having stored therein computer-readable program code, which when executed by a computer hardware system, causes the computer hardware system to perform:
        identifying, by a monitoring application and from manifest data of a process executing within the computer hardware system, a type of inter-process communication associated with the process;

rewriting, by the monitoring application, manifest data of the monitoring application to accept the type of inter-processing communication;

determining, using the monitoring application, a type of the security vulnerability associated with an inter-process communication issued from the process; and performing, based upon the determined type of the security vulnerability, a predefined action.

14. The computer program product of claim 13, wherein the predefined action is presenting, to a user, a description of the security vulnerability.

15. The computer program product of claim 13, wherein the predefined action includes terminating the process.

16. The computer program product of claim 13, wherein the predefined action includes quarantining the process.

17. The computer program product of claim 13, wherein the determined type of security vulnerability is sensitive data being provided by the process.

18. The computer program product of claim 13, wherein the determined type of security vulnerability is sensitive data being requested by the process.

* * * * *